(12) United States Patent
Hüger et al.

(10) Patent No.: US 10,913,352 B2
(45) Date of Patent: Feb. 9, 2021

(54) METHOD, COMPUTER PROGRAM AND DEVICE FOR THE REMOTE CONTROL OF A TRANSPORTATION VEHICLE VIA A MOBILE DEVICE

(71) Applicant: VOLKSWAGEN AKTIENGESELLSCHAFT, Wolfsburg (DE)

(72) Inventors: Fabian Hüger, Wolfenbüttel (DE); Asisa Asseily, Berlin (DE)

(73) Assignee: Volkswagen Aktiengesellschaft

( * ) Notice: Subject to any disclaimer, the term of this patent is extended or adjusted under 35 U.S.C. 154(b) by 308 days.

(21) Appl. No.: 16/068,480

(22) PCT Filed: Dec. 7, 2016

(86) PCT No.: PCT/EP2016/080085
§ 371 (c)(1),
(2) Date: Jul. 6, 2018

(87) PCT Pub. No.: WO2017/118509
PCT Pub. Date: Jul. 13, 2017

(65) Prior Publication Data
US 2019/0023129 A1  Jan. 24, 2019

(30) Foreign Application Priority Data
Jan. 6, 2016 (DE) .................. 10 2016 200 061

(51) Int. Cl.
*B60K 35/00* (2006.01)
*B60W 50/08* (2020.01)
(Continued)

(52) U.S. Cl.
CPC ............ *B60K 35/00* (2013.01); *B60W 50/08* (2013.01); *G06Q 10/06* (2013.01); *G07C 5/008* (2013.01);
(Continued)

(58) Field of Classification Search
CPC ............ B60K 35/00; B60K 2370/566; B60K 2370/573; B60K 2370/11; B60W 50/08; G06Q 10/06; G07C 5/008
See application file for complete search history.

(56) References Cited

U.S. PATENT DOCUMENTS 9,513,867 B1 * 12/2016 Tokunaga ............... G06F 3/165
2009/0069953 A1   3/2009 Hale et al.
(Continued)

FOREIGN PATENT DOCUMENTS

DE   102007039206 A1   6/2009
DE   102012006369 A1   10/2012
(Continued)

OTHER PUBLICATIONS

Search Report for German Patent Application No. 10 2016 200 061.6; dated Nov. 3, 2016.
(Continued)

*Primary Examiner* — Thomas Ingram
(74) *Attorney, Agent, or Firm* — Barnes & Thornburg LLP

(57) ABSTRACT

A method, computer program, and devices for the remote control of a transportation vehicle via a mobile device. The method includes determining a proposal for triggering a functionality of the transportation vehicle; outputting the proposal via an output device; detecting a reaction of a user of the mobile device, wherein the reaction consists of an input via the input device or of the absence of an input; and transmitting a triggering signal for the functionality from the mobile device to the transportation vehicle in response to the input being absent within a period of time or in response to the event not corresponding to a termination of the proposal.

13 Claims, 5 Drawing Sheets

(51) Int. Cl.
*G06Q 10/06* (2012.01)
*G07C 5/00* (2006.01)

(52) U.S. Cl.
CPC ... *B60K 2370/111* (2019.05); *B60K 2370/566* (2019.05); *B60K 2370/573* (2019.05)

(56) References Cited

U.S. PATENT DOCUMENTS

| | | | | |
|---|---|---|---|---|
| 2013/0226369 | A1* | 8/2013 | Yorio | G07C 5/008 |
| | | | | 701/1 |
| 2014/0108307 | A1* | 4/2014 | Raghunathan | G06N 20/00 |
| | | | | 706/12 |
| 2014/0232534 | A1* | 8/2014 | Birnbaum | G06F 3/016 |
| | | | | 340/407.1 |
| 2014/0247158 | A1* | 9/2014 | Tengler | H04W 4/029 |
| | | | | 340/901 |
| 2020/0154238 | A1* | 5/2020 | Thomas | H04W 4/027 |

FOREIGN PATENT DOCUMENTS

| | | |
|---|---|---|
| DE | 102013211162 A1 | 12/2014 |
| DE | 102014223275 A1 | 5/2015 |
| DE | 102014004265 A1 | 9/2015 |
| EP | 2672739 A1 | 12/2013 |
| EP | 2786888 A2 | 10/2014 |
| EP | 2914023 A2 | 9/2015 |

OTHER PUBLICATIONS

Search Report for International Patent Application No. PCT/EP2016/080085; dated Feb. 10, 2017.

\* cited by examiner

METHOD, COMPUTER PROGRAM AND DEVICE FOR THE REMOTE CONTROL OF A TRANSPORTATION VEHICLE VIA A MOBILE DEVICE

PRIORITY CLAIM

This patent application is a U.S. National Phase of International Patent Application No. PCT/EP2016/080085, filed 7 Dec. 2016, which claims priority to German Patent Application No. 10 2016 200 061.6, filed 6 Jan. 2016, the disclosures of which are incorporated herein by reference in their entireties.

SUMMARY

Illustrative embodiments relate to a method, a computer program and to apparatuses for remotely controlling a transportation vehicle by a mobile device, more specifically, but not exclusively, based on ascertaining a proposal to trigger a functionality of the transportation vehicle and perform the functionality, provided that a user of the mobile device does not terminate the proposal.

BRIEF DESCRIPTION OF THE DRAWINGS

Disclosed embodiments are described in more detail below based on the drawings, to which, however, exemplary embodiments generally are not restricted overall. In the drawings.

DETAILED DESCRIPTION

Figure 1:
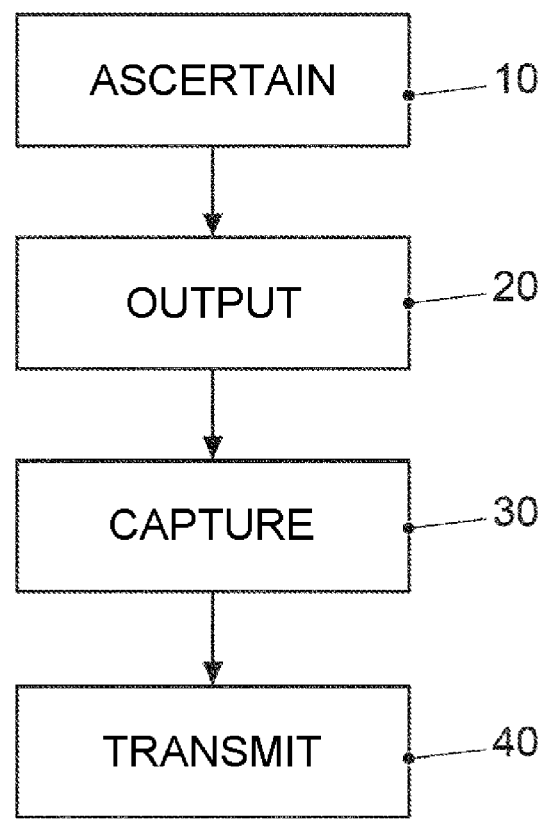
FIG. 1 illustrates a block diagram of an exemplary embodiment of a method for remotely controlling functions of a transportation vehicle by a mobile device.

A connection from mobile devices to information systems of transportation vehicles is an important trend in transportation vehicle construction. Functions of the mobile device, for example, the depiction of navigation information or the playback of music or other media, can be transmitted to a screen or a loudspeaker system of the transportation vehicle. At the same time, the mobile device can provide the transportation vehicle with a, possibly broadband, Internet connection.

Aside from forwarding functions of the mobile device for an information system of the transportation vehicle and providing an Internet connection, mobile devices can further be used to control functions of the transportation vehicle. In conventional systems, for example, in carsharing (short-term rental of a transportation vehicle), a mobile device can be used, by way of example, to open a transportation vehicle, for example, via short-range radio or via an Internet connection, and provide the user with access to the transportation vehicle.

However, such operation of a transportation vehicle for the most part presupposes that the user of the mobile device opens an application (also app for short) of the transportation vehicle manufacturer or of a rental company on the mobile device, selects the action in the app and performs the action, which can produce an additional time involvement.

There is thus a need to provide an improved design for triggering transportation vehicle functions by a mobile device. This need is met by the method, the computer program and the apparatuses according to the independent claims.

Exemplary embodiments can achieve this by ascertaining a proposal to trigger a functionality. A mobile device (an app or an apparatus for the mobile device) may be configured to make a prediction, for example, based on ambient indicators, of which transportation vehicle function a user of the mobile device wants to perform in particular situations. By way of example, the mobile device may be configured to ascertain that the user wishes to open the transportation vehicle if he moves toward the transportation vehicle and is just a few meters/centimeters away from the transportation vehicle door. In a further example, the mobile device may be configured to predict that the user of the mobile device wishes to activate the air-conditioning system in hot weather (for example, above a temperature threshold), for example, half an hour before he leaves the office on time. The mobile device may be configured to output the proposal to the user, whereupon the user can terminate the proposal. If the user does not terminate the proposal, then the mobile device may be configured to initiate performance of the functionality of the transportation vehicle.

Exemplary embodiments provide a method for remotely controlling functions of a transportation vehicle via a mobile device. The method comprises ascertaining a proposal to trigger a functionality of the transportation vehicle. The method further comprises outputting the proposal via an output device. The method further comprises capturing a reaction of a user of the mobile device. The reaction consists of an input via an input device or of the absence of an input. The method further comprises transmitting a trigger signal for the functionality from the mobile device to the transportation vehicle if the input is absent within a period of time or if the input is not consistent with termination of the proposal. The ascertainment of the proposal and performance if the user does not stop execution of the proposal increases a convenience for the user and allows automatic use of transportation vehicle functions in detected situations.

In some exemplary embodiments, the outputting of the proposal is consistent with outputting of an intervention option for the user of the mobile device that allows the user to influence the triggering of the functionality via the input device. The execution of the proposal, if the user does not stop it, increases a convenience for the user and allows automatic performance of functions of the transportation vehicle.

In some exemplary embodiments, the ascertaining further comprises capturing a plurality of ambient indicators and determining the proposal based on the plurality of ambient indicators. The determining of the proposal based on ambient indicators allows situative ascertainment of the proposal, based on a situation that the user of the transportation vehicle/mobile device or the transportation vehicle is in.

In at least some exemplary embodiments, the capturing comprises obtaining at least one subset of the plurality of ambient indicators from the mobile device. Alternatively or additionally, the capturing can comprise obtaining at least one subset of the plurality of ambient indicators from the transportation vehicle. In some exemplary embodiments, the capturing can comprise ascertaining at least one subset of the plurality of ambient indicators by at least one sensor device of the mobile device. The obtaining of the ambient indicators from the mobile device allows use of data provided by the mobile device that the mobile device can obtain via an Internet connection, for example. Ambient indicators of the transportation vehicle can make the proposal dependent on a state of the transportation vehicle, for example, a fuel tank level, an interior temperature or a speed. The ascertaining of the ambient indicators by a sensor system of the mobile device further allows use of a position and an orientation/acceleration of the mobile device.

In at least, the plurality of ambient indicators comprises at least two elements from the group comprising the closed state of the transportation vehicle, position of the transportation vehicle, position of the transportation vehicle relative to a point of interest, position of the transportation vehicle relative to the mobile device, trajectory of the transportation vehicle, state of the transportation vehicle, speed of the transportation vehicle, exterior temperature, interior temperature of the transportation vehicle, position of the mobile device, fuel tank level of the transportation vehicle, time of day and day of the week. The determining of the proposal based on ambient indicators allows situative ascertainment of the proposal, based on a situation that the user of the transportation vehicle/mobile device or the transportation vehicle is in.

In some exemplary embodiments, the method further comprises determining a situation that the transportation vehicle, the mobile device and/or the user of the mobile device is/are in based on the plurality of ambient indicators. The determining of the proposal can further be consistent with a selection of the proposal based on the situation. The determining of the situation allows a simplified selection of the proposal, for example, by allocation of detected situations and possible proposals.

In some exemplary embodiments, the method further comprises determining functionalities triggered by the user in a plurality of situations. The determining of the proposal can be based on the functionalities triggered by the user and on the situation. The determining of functionalities triggered by the user allows adaptation of the proposal by a learning algorithm or a learning function.

In at least some exemplary embodiments, the determining further comprises assigning situations from the plurality of situations to triggered functionalities, based on a learning algorithm or based on a probability function. The determining of functionalities triggered by the user allows adaptation of the proposal by a learning algorithm or a learning function, and can allow the proposal to be better attuned to a user behavior.

In at least some exemplary embodiments, the outputting comprises visual output, haptic output, audio output or audiovisual output. A flexibility for the output can situatively increase a convenience, for example, if a user in a situation has no opportunity to read a screen.

Exemplary embodiments further provide a program having a program code for performing the method as claimed in one of the preceding claims, when the program code is executed on a computer, a processor, a control module or a programmable hardware component.

Exemplary embodiments further provide an apparatus for a mobile device. The apparatus comprises a communication device for communication with a transportation vehicle. The apparatus further comprises a control device, configured to control the communication device. The control device is further configured to ascertain a proposal to trigger a functionality of the transportation vehicle. The control device is further configured to output the proposal via an output device. The control device is further configured to capture a reaction of a user of the mobile device. The reaction consists of an input via an input device or of the absence of an input. The control device is further configured to transmit a trigger signal for the functionality to the transportation vehicle via the communication device if the input is absent within a period of time or if the input is not consistent with termination of the proposal.

Exemplary embodiments further provide an apparatus for a transportation vehicle. The apparatus comprises a communication device, configured for communication with a mobile device. The apparatus further comprises a control device, configured to control the communication device. The control device is further configured to provide information about one or more ambient indicators of the transportation vehicle for the mobile device via the communication device. The control device is further configured to obtain a trigger signal for a functionality of the transportation vehicle, for remotely controlling the transportation vehicle. The trigger signal is based on a proposal to trigger the functionality based on a plurality of ambient indicators that a user of the mobile device has not terminated. The control device is further configured to control the transportation vehicle based on the trigger signal.

Various exemplary embodiments will now be described more thoroughly with reference to the accompanying drawings, which depict some exemplary embodiments. In the figures, the thickness dimensions of lines, layers and/or regions may be depicted in an exaggerated state for the sake of clarity.

In the following description of the accompanying figures, which merely show some illustrative exemplary embodiments, identical reference signs may denote identical or comparable components. Furthermore, collective reference signs may be used for components and objects that occur multiply in an exemplary embodiment or in a drawing but are described jointly with regard to one or more features. Components or objects described with identical or collective reference signs may have individual, a plurality of or all features, for example, their dimensionings, embodied in an identical state, but possibly also differently, unless the description explicitly or implicitly reveals otherwise.

Although exemplary embodiments may be modified and altered in various ways, exemplary embodiments are depicted as examples in the figures and are described thoroughly herein. It should be clarified, however, that the intention is not for exemplary embodiments to be restricted to the forms respectively disclosed, rather that exemplary embodiments are intended to cover all functional and/or structural modifications, equivalents and alternatives that lie within the scope of the disclosure. Identical reference signs denote identical or similar elements throughout the description of the figures.

It should be noted that one element referred to as being "connected" or "coupled" to another element may be directly connected or coupled to the other element or intervening elements may be present. If an element is referred to as "directly connected" or "directly coupled" to another element, on the other hand, then there are no intervening elements present. Other terms used to describe the relationship between elements should be interpreted in a similar manner (e.g., "between" vis-à-vis "directly therebetween", "adjacent" vis-à-vis "directly adjacent", etc.).

The terminology used herein serves only to describe particular exemplary embodiments and is not intended to restrict the exemplary embodiments. As used herein, the singular forms "a" and "the" are also intended to include the plural forms, unless clearly indicated otherwise by the context. Further, it should be clarified that the expressions such as, e.g., "comprises", "comprising", "has" and/or "having", as used herein, indicate the presence of stated features, whole numbers, operations, work sequences, elements and/or components, but do not rule out the presence or the addition of one or more features, whole numbers, operations, work sequences, elements, components and/or groups thereof.

Unless defined otherwise, all of the terms used herein (including technical and scientific terms) have the same meaning that is ascribed to them by a person of average skill in the art in the field to which the exemplary embodiments belong. Further, it should be clarified that expressions, e.g., those defined in generally used dictionaries, should be interpreted as if they have the meaning consistent with their meaning in the context of the relevant art, and should not be interpreted in an idealized or excessively formal sense, as long as this is not expressly defined herein.

A programmable watch (also smartwatch) or a programmable cell phone (also smartphone) can be used to control various transportation vehicle functions in transportation vehicles today. In conventional systems, the applicable functions can be controlled by the user after an application is started on a smartwatch/smartphone. In many cases, this requires the app to be started first of all and a suitable function selected from a list of functions. Frequently, a large number of interaction processes between the user and the system are needed. For these, it is first of all possible for an app or a widget (operator control element) to be called, within which it is possible to navigate to a function group for a function if need be.

In exemplary embodiments, a mobile device, for example, a smartwatch or a smartphone, can provide interaction options suited to a situation. By way of example, the mobile device can learn from the interactions of the user, for example, via pattern recognition or a learning algorithm, to improve the provision of the interaction options and to provide a proposal to trigger a transportation vehicle function to the user. In exemplary embodiments, the mobile device may be configured to trigger actions (transportation vehicle functions) automatically, the user being able to terminate or stop performance. The determination of a proposal and the automatic execution of the proposal allow the number of interaction operations required to be reduced. The user can be provided with the most relevant interaction options for his situation.

In exemplary embodiments, the mobile device can capture a situation known as ambient indicators, which can comprise a state of the transportation vehicle, ambient conditions such as, e.g., the temperature or a position of the transportation vehicle and the mobile device. As a reaction to one or more ambient indicators, the mobile device can provide or else directly perform triggering of a functionality.

FIG. 1 shows a flowchart for an exemplary embodiment of a method for remotely controlling functions of a transportation vehicle 200 by a mobile device 100.

The method comprises ascertaining 10 a proposal to trigger a functionality of the transportation vehicle 100. The ascertaining 10 may be consistent with selection of a proposal from a plurality of possible proposals, for example.

Figure 1A:
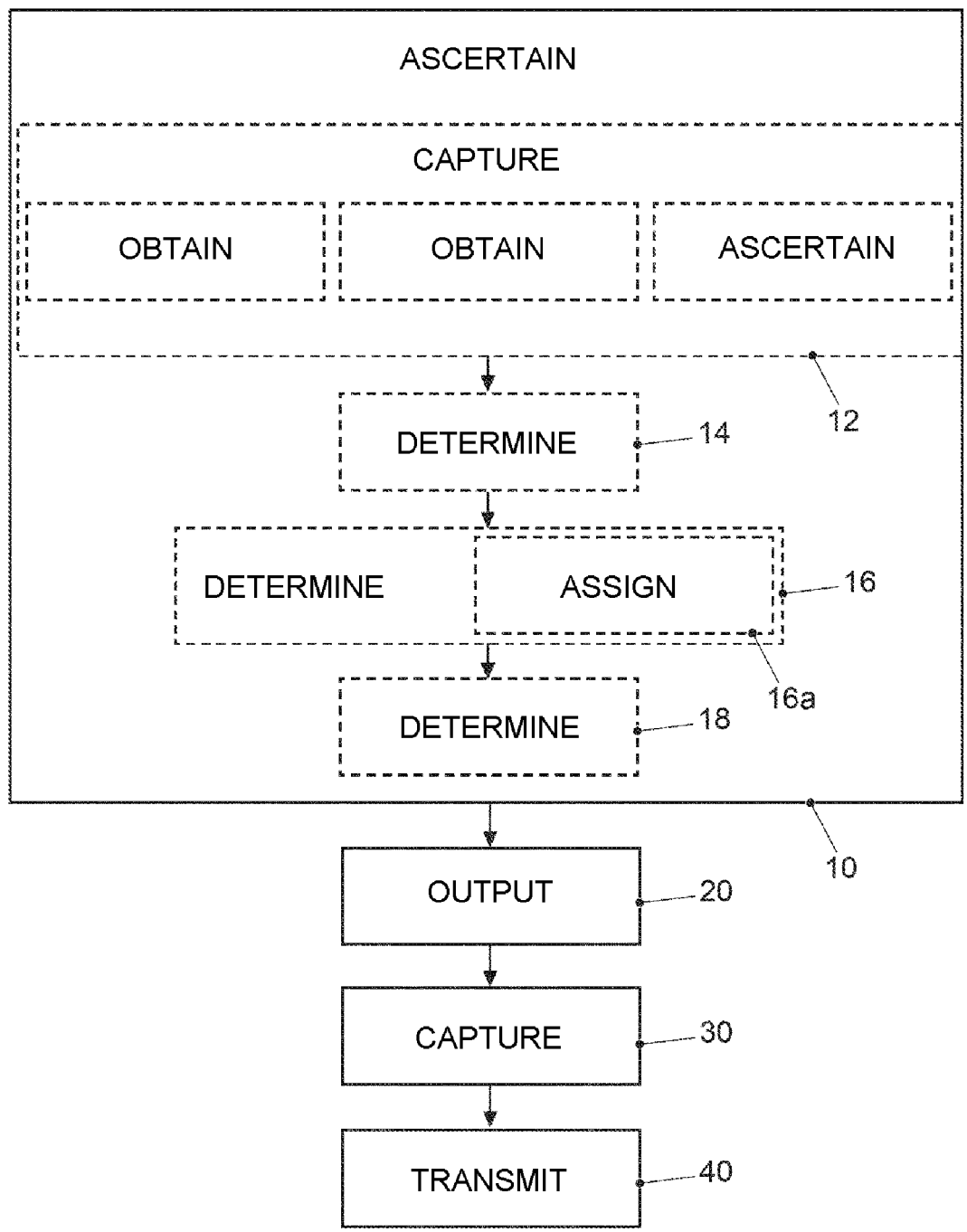
FIG. 1a illustrates a block diagram of a detailed exemplary embodiment of a method for remotely controlling functions of a transportation vehicle by a mobile device.

The ascertaining 10, in some exemplary embodiments, as shown in FIG. 1a, further comprises capturing 12 a plurality of ambient indicators. By way of example, the capturing 12 can comprise obtaining 12a at least one subset of the plurality of ambient indicators from the mobile device 100. The mobile device can obtain the ambient indicators from a server, for example. Alternatively or additionally, the capturing 12 can comprise obtaining 12b at least one subset of the plurality of ambient indicators from the transportation vehicle 200.

By way of example, the transportation vehicle 200 may be configured to determine the ambient indicators based on sensors of the transportation vehicle or to determine the ambient indicators based on useful data of the onboard electronics. The capturing 12 can further comprise ascertaining 12c at least one subset of the plurality of ambient indicators by at least one sensor device of the mobile device 100. The mobile device 100, or an apparatus 10 from FIG. 4, may be configured, by way of example, to use sensor data of the sensor device to determine the at least one subset of the plurality of ambient indicators based on the sensor data, for example, based on position sensor data, acceleration sensor data, camera sensor data, microphone sensor data, sensor data of a gyroscope, temperature sensor data, sensor data of a radio device of the mobile device or pressure sensor data of the mobile device. By way of example, the position of the transportation vehicle can be ascertained absolutely, for example, via a satellite-assisted positioning system such as the global positioning system (GPS), for example, relatively between the mobile device 100 and the transportation vehicle 200 (for example, via a range of a communication system of the transportation vehicle 200), or based on location data of a cellular mobile radio communication system, for example, by the mobile device 100 and/or the apparatus 110.

By way of example, the ascertaining can further comprise determining 18 the proposal based on the plurality of ambient indicators. The plurality of ambient indicators can comprise, by way of example, at least two elements from the group comprising the closed state of the transportation vehicle 200, position of the transportation vehicle 200, position of the transportation vehicle 200 relative to a point of interest, position of the transportation vehicle relative to the mobile device 100, trajectory of the transportation vehicle 200, state of the transportation vehicle 200, speed of the transportation vehicle 200, exterior temperature, interior temperature of the transportation vehicle 200, position of the mobile device 100, fuel tank level of the transportation vehicle 200, time of day and day of the week.

In some exemplary embodiments, the method further comprises determining 14 a situation that the transportation vehicle 200, the mobile device 100 and/or the user of the mobile device 100 is/are in based on the plurality of ambient indicators. By way of example, the determining 18 of the proposal may further be consistent with a selection of the proposal based on the situation. In some exemplary embodiments, the determining 14 may be consistent with a categorization of situations based on the plurality of ambient indicators, for example. By way of example, the determining 14 can determine the situation based on trigger criteria that may also be based on multiple ambient indicators. By way of example, the trigger criteria may be based on a previous behavior of the user of the mobile device, or on a database of possible situations, trigger criteria and/or ambient indicators.

In some exemplary embodiments, the method can further comprise determining 16 functionalities triggered by the user in a plurality of situations. By way of example, the determining 16 can comprise storing ambient indicators or detected situations that are current for the functionalities triggered by the user at this time. By way of example, the determining 16 can further comprise assigning 16*a* situations from the plurality of situations to triggered functionalities, based on a learning algorithm or based on a probability function. By way of example, the determining 16 can comprise computing probabilities for the triggering of a transportation vehicle function for particular manifestations of the ambient indicators or combinations of ambient indicators from the plurality of ambient indicators. By way of example, the determining 16 can comprise machine learning, or pattern recognition to recognize patterns of triggered functions and ambient indicators. In some exemplary embodiments, the determining 16 can be performed by the mobile device 100. Alternatively or additionally, the determining 16 can be provided or supported by a server or a remote computation unit. By way of example, the determining 16 can be provided by an apparatus for the transportation vehicle. The apparatus for the transportation vehicle may be configured to provide the determining 16, further suboperations of the method operation at 10 and/or the method operation at 10, for example. The determining 18 of the proposal may be based on the functionalities triggered by the user and on the situation.

In some situations, the determining 16 of functionalities triggered by the user in the plurality of situations can also comprise determining functionalities implicitly triggered by the user, for example, driving a distance, for example, based on a time of day or a volume of traffic, driving with particular driving dynamics, or driving with a particular temporal or local distance of driving interruptions. The determining 18 of the proposal may further be based on the functionalities implicitly triggered by the user. By way of example, the determining 18 can comprise determining traffic information for a probable route or determining route proposals.

In some exemplary embodiments, the ascertaining 10 can further comprise determining a probability that the proposal is desired by the user. By way of example, the assigning 16*a* can comprise computing probabilities for the triggering of a proposal in a situation or the plurality of situations. In an exemplary embodiment, the proposal can be output if the probability of triggering is above a probability threshold value, for example, above 50%, 60%, 70%, 75%, 80% or 90%. In some exemplary embodiments, a distinction can be drawn depending on probability: if the probability is above a first probability threshold value, then the proposal can be output and the user needs to confirm it or he needs to have at least been aware of the output (for example, established by detection of an arm posture in the case of a smartwatch that activates the screen) to trigger performance. If the probability is above a second probability threshold value that is higher than the first probability threshold value, then the trigger signal can be transmitted provided that the user does not actively terminate this.

The method further comprises outputting 20 the proposal via an output device. By way of example, the outputting 20 can comprise visual output, haptic output, audio output or audiovisual output, for example, even a combination of output options. The output device, for example, an output device 116 from FIG. 4, may be consistent with at least one element from the group comprising a screen, a vibration device, a haptic output module, a Braille output module, a loudspeaker and an audio output device, for example. By way of example, the outputting 20 of the proposal may be consistent with output of an intervention option for the user of the mobile device 100 that allows the user to influence the triggering of the functionality via the input device. By way of example, the outputting 20 may be consistent with output of a button via a screen, the triggering of which terminates or stops performance of the functionality. Alternatively or additionally, vibration of the mobile device 100 can announce that a proposed function is performed provided that it has not been terminated or stopped by the user. A voice or audio output can also indicate imminent execution of a proposal, for example, with advice as to how the execution can be terminated or stopped.

The method further comprises capturing 30 a reaction of a user of the mobile device 100. The reaction consists of an input via an input device or of the absence of an input. The input device, for example, an input device 118 from FIG. 4, may, by way of example, a keypad, a key, a button, a touch-sensitive screen, a microphone, a gyroscope or acceleration sensor (also accelerometer), or a sensor module for capacitively measuring approaches. By way of example, the capturing 30 may be consistent with capture of triggering of a button, for example, on a touch-sensitive screen of a smartphone or a smartwatch. Alternatively or additionally, the capturing 30 may be consistent, by way of example, with capture of a shaking movement of the mobile device 100, for example, via a gyroscope or an acceleration sensor. By way of example, the capturing 30 may further be consistent with capture of a gesture control, for example, of a swipe gesture via a touch-sensitive screen, a knocking gesture on the mobile device or a predefined holding position or posture of the mobile device 100.

By way of example, the absence of the input may be consistent with an absence of an input via the input orientation during a predefined period of time. By way of example, the absence of the input may also be consistent with an unrecognized input, for example, a voice command or an input on a touch-sensitive screen that cannot be associated with a voice command, a button or gesture control.

The method further comprises transmitting 40 a trigger signal for the functionality from the mobile device 100 to the transportation vehicle 200 if the input is absent within a period of time or if the input is not consistent with termination of the proposal. By way of example, the trigger signal may be consistent with a data signal, for example, data packets transmitted from the mobile device 100 to the transportation vehicle 200. By way of example, the input may be consistent with agreement to the proposal, so that, by way of example, the action can be triggered more quickly than by not making the input. In an exemplary embodiment, the transmitting 40 of the trigger signal can take place automatically if the user of the mobile device 100 does not terminate or stop triggering of the function, for example, by input via the input device.

By way of example, the functionality may be consistent with at least one element from the group comprising control of a closed state of the transportation vehicle 200, window control of at least one window of the transportation vehicle 200, control of an entertainment function of the transportation vehicle 200, control of an ergonomic setting (seat position, steering wheel position, mirror position, etc.), loading of a user profile, control of an air-conditioning function, control of a lighting, control of a fuel cap, control of a localization aid, control of automated forward movement of the transportation vehicle 200, control of opening or closing of a trunk of the transportation vehicle 200, control of a transportation vehicle setup (for example, sport, economic, etc.) of the transportation vehicle 200, determination of route guidance, from a probable traffic or loading of a map for a navigation unit of the transportation vehicle 200, loading of a driving assistance user profile for the transportation vehicle 200, loading of a user profile of a user of the transportation vehicle (for example, for car rental, carsharing), and control of a lighting of the transportation vehicle 200.

Figure 2A:
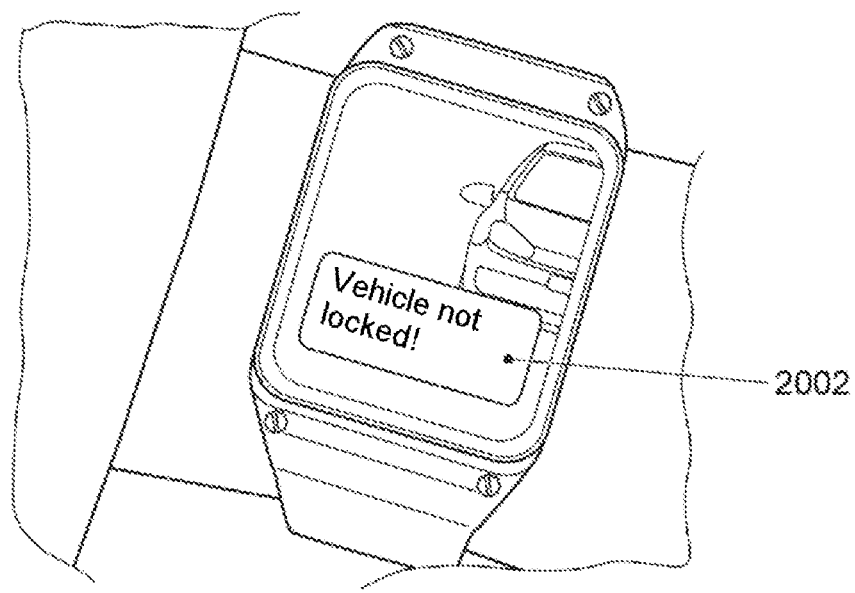
FIG. 2a shows exemplary outputs from an output module.
Figure 2B:
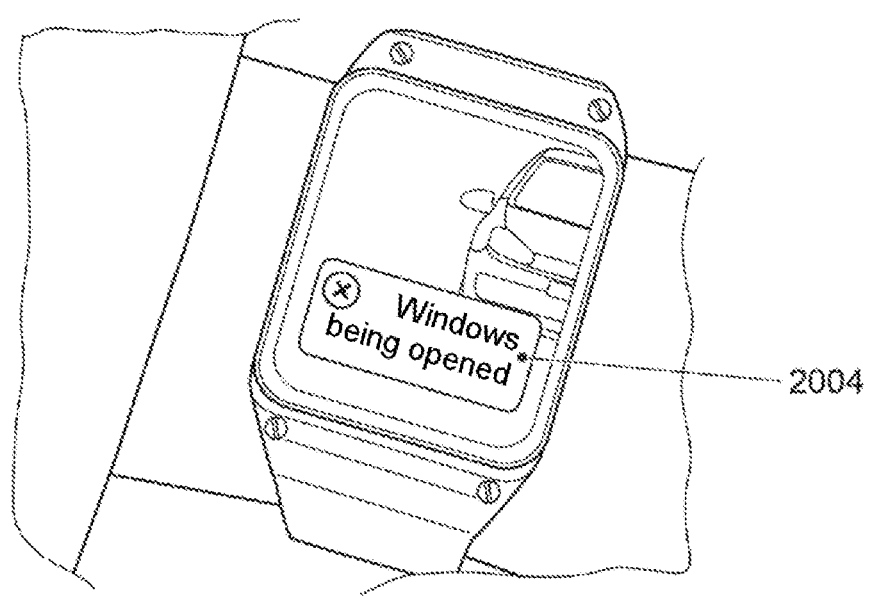
FIG. 2b shows exemplary outputs from an output module.

In an illustrative exemplary embodiment, the ascertaining operation at 18 can involve, by way of example, the ambient indicators "The mobile device 100 is moving away from the transportation vehicle 200", "The transportation vehicle 200 is not at home" and "The 200 transportation vehicle is not locked" being able to be used to ascertain locking of the proposal as the proposal. The output device, for example, a screen of a smartwatch as in FIG. 2a, can be used to output an applicable warning 2002, for example. The user can step in to stop locking of the transportation vehicle, and if he does not step in then the transmission (40) of the trigger signal to lock the transportation vehicle can be sent.

Figure 3:
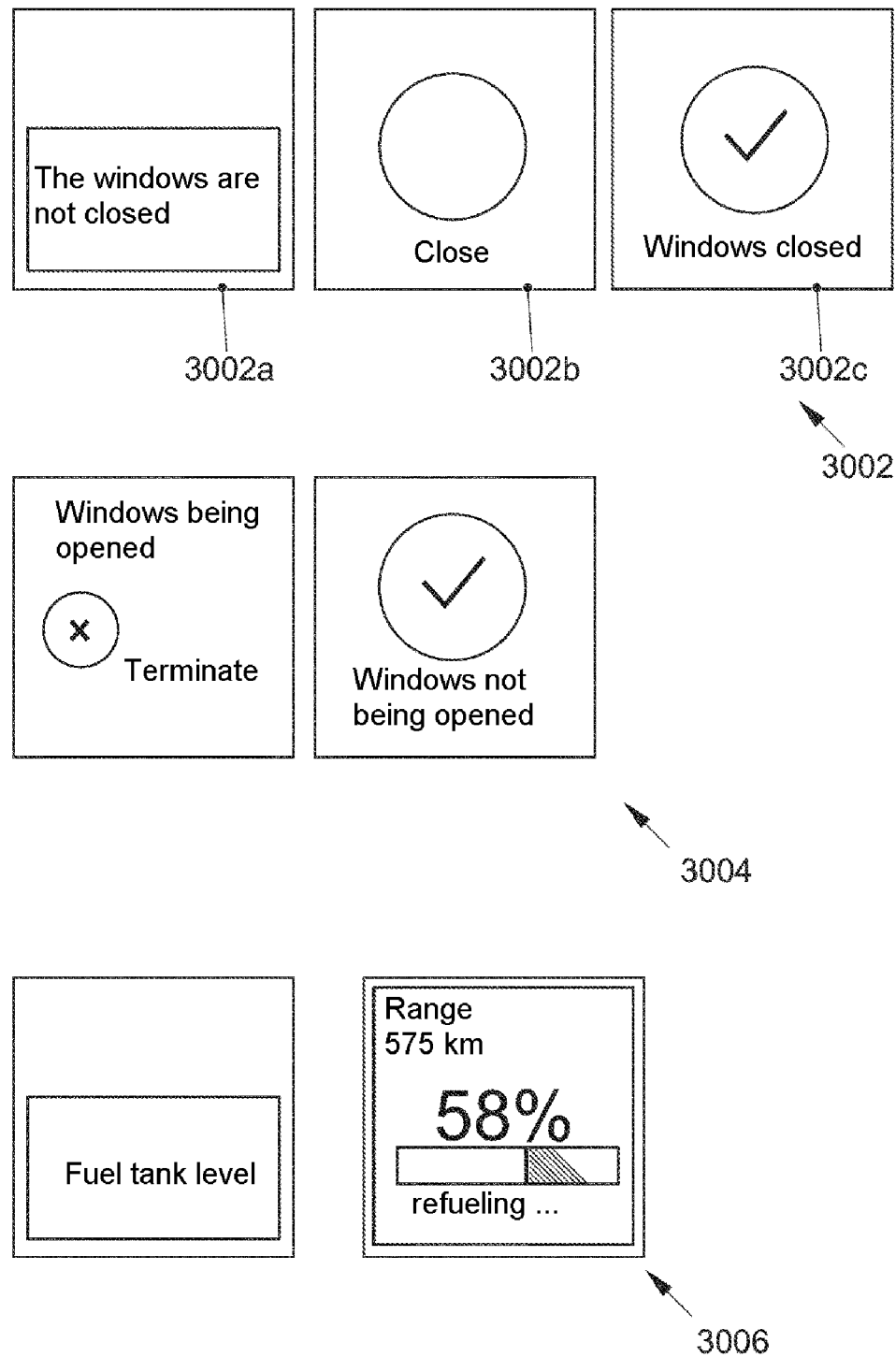
FIG. 3 shows exemplary output elements of an output from an output module.

In a further exemplary embodiment, the transportation vehicle 200 may be in range of the mobile device 100 and the user moves away from the transportation vehicle 200 and has forgotten to close the windows. Instead of multiple operator control operations in an app, the windows can be closed automatically, provided that the user does not terminate or stop closure, or the user can, on the basis of the depiction of the proposal, use only one or two operator control operations to close the windows (FIG. 3, 3002, for example, by a combination of the operations display 3002a, in which a warning is depicted, and which can be confirmed by a swipe gesture, triggering 3002b of closure of the window, which can be triggered by a push of the button, and confirmation 3002c).

In a further illustrative exemplary embodiment, the ambient indicators may be "The user is on his way from the office to the transportation vehicle 200" and "The temperature is higher than 28 degrees". In the determining operation at 16, it is possible to establish that the driver always opens the windows at above 28° C. at the GPS position of the car park of his work. Given a high probability, this function is automatically triggered by transmitting 40 the trigger signal. The function can only be terminated using the smartwatch (FIG. 2b, 2004, FIG. 3, 3004).

In a further exemplary embodiment, the method can further comprise outputting ambient indicators. According to a detected situation, context-sensitive convenience functions can also be provided on the mobile device. In the example (FIG. 3, 3006), the fuel tank level can be displayed at or close to a filling station and the range can be displayed during refueling.

Figure 4:
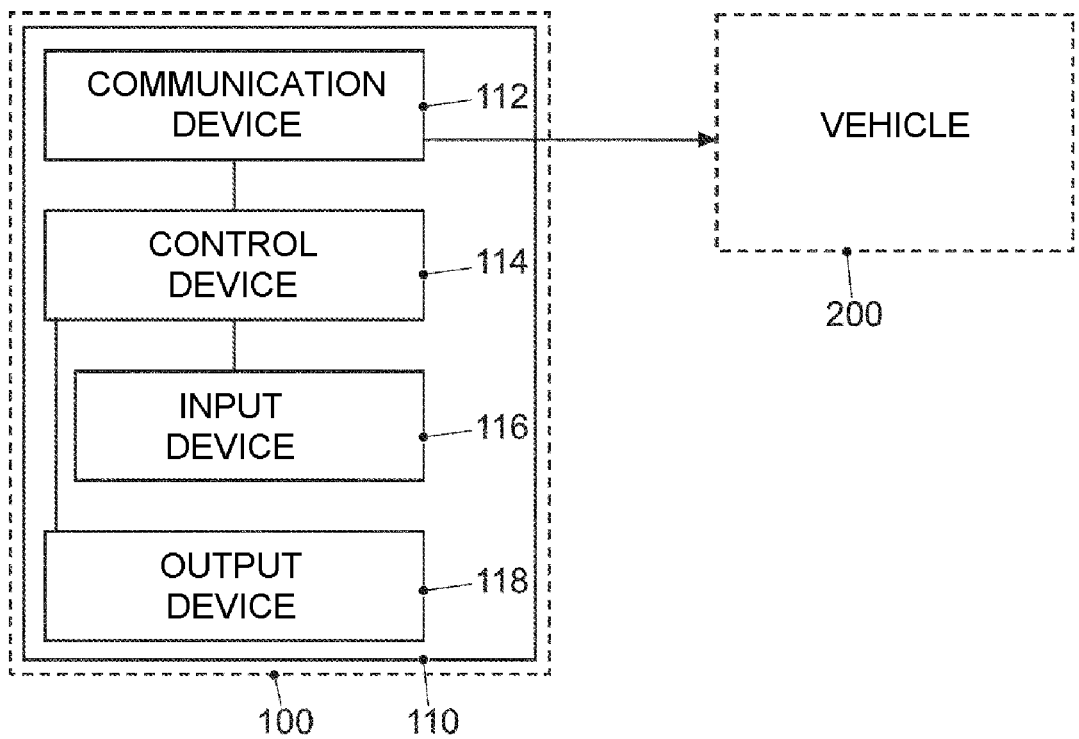
FIG. 4 illustrates a block diagram of an exemplary embodiment of an apparatus for a mobile device.

FIG. 4 shows a block diagram of an exemplary embodiment of an apparatus 110 for a mobile device 100. By way of example, the mobile device 110 may be consistent with a programmable telephone, a smartphone, a programmable watch, a smartwatch, a tablet computer, a programmable armband or a wearable (computer wearable on the body). The apparatus 110 comprises a communication device 112 for communication with a transportation vehicle 200. The communication device 112, and, by way of example, a communication device 212 from FIG. 5, may be consistent, by way of example, with a wireless communication device, for example, a short-range radio or mobile radio communication device, for example, for a cellular mobile communication system. The communication device may, by way of example, be configured to communicate using at least one element from the group comprising BLUETOOTH®, near field communication (NFC), using a wireless local area network (also wireless local access network WLAN), using vehicle-to-X communication (also Car2X), or using a mobile radio system, which are standardized by applicable standardization committees, such as, e.g., the 3rd Generation Partnership Project (3GPP) group. By way of example, these comprise the Global System for Mobile Communications (GSM), Enhanced Data Rates for GSM Evolution (EDGE), GSM EDGE Radio Access Network (GERAN), the Universal Terrestrial Radio Access Network (UTRAN) or the Evolved UTRAN (E-UTRAN), such as, e.g., the Universal Mobile Telecommunication System (UMTS), Long Term Evolution (LTE) or LTE-Advanced (LTE-A), or else mobile radio systems from other standards, such as, e.g., the Worldwide Interoperability for Microwave Access (WIMAX), IEEE802.16 or wireless local area network (WLAN), IEEE802.11, and also generally a system that is based on a time division multiple access (TDMA) method, frequency division multiple access (FDMA) method, code division multiple access (CDMA) method, orthogonal frequency division multiple access (OFDMA) method or another technology or multiple access method.

The apparatus 100 further comprises a control device 114, configured to control the communication device 112. The control device 114 is further configured to ascertain a proposal to trigger a functionality of the transportation vehicle 100. The control device is further configured to output the proposal via an output device 116. The control device 114 114 is further configured to capture a reaction of a user of the mobile device 100. The reaction consists of an input via an input device 118 or of the absence of an input. The control device 114 is further configured to transmit a trigger signal for the functionality to the transportation vehicle 200 via the communication device 112 if the input is absent within a period of time or if the input is not consistent with termination of the proposal.

Figure 5:
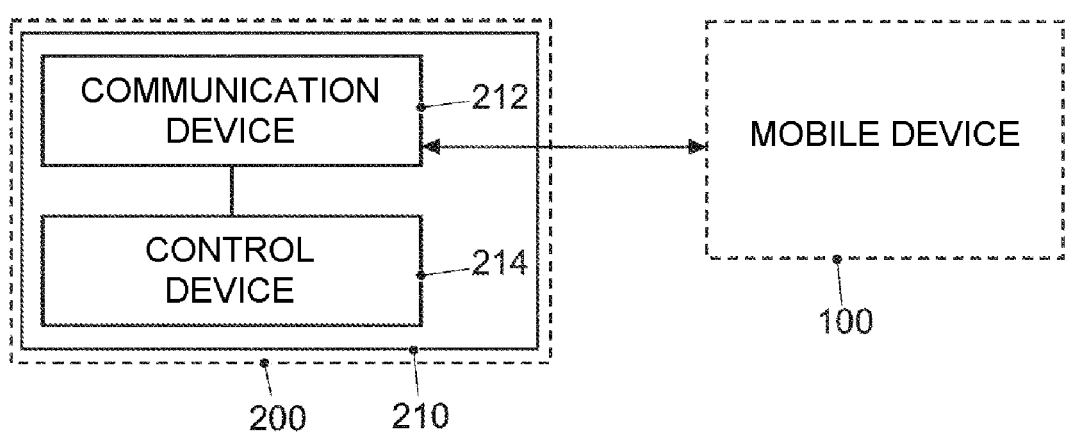
FIG. 5 illustrates a block diagram of an exemplary embodiment of an apparatus for a transportation vehicle.

In exemplary embodiments, the control device 114, and a control device 214 from FIG. 5, may be consistent with any controller or processor or a programmable hardware component. By way of example, the control device 114; 214 may also be realized as software programmed for an applicable hardware component. In this respect, the control device 114; 214 may be implemented as programmable hardware with appropriately adapted software. In this case, any processors, such as digital signal processors (DSPs), can be used. Exemplary embodiments in this case are not limited to one particular type of processor. Any processors or else multiple processors are conceivable for implementing the control device 114; 214.

In at least some exemplary embodiments, the control device 114 is coupled to the communication device 112, to the output device 116 and to the input device 118.

FIG. 5 shows a block diagram of an exemplary embodiment of an apparatus 210 for a transportation vehicle 200. The apparatus 210 comprises a communication device 212, configured for communication with a mobile device 100. The apparatus 210 further comprises a control device 214, configured to control the communication device 212. The control device 214 is further configured to provide information about one or more ambient indicators of the transportation vehicle 200 for the mobile device 100 via the communication device 212. The control device 214 is further configured to obtain a trigger signal for a functionality of the transportation vehicle 200 for remotely controlling the transportation vehicle 200. The trigger signal is based on a proposal to trigger the functionality based on a plurality of ambient indicators that a user of the mobile device 100 has not terminated. The control device 214 is further configured to control the transportation vehicle 200 based on the trigger signal.

By way of example, the control device 214 may be configured to use a control bus to control the functionality of the transportation vehicle based on the trigger signal. By way of example, the control device 214 may be configured to trigger the functionality, or, by way of example, the control device 214 may be configured to adapt one or more values or parameters of a functionality based on the trigger signal.

The control device 214 is coupled to the communication device 212. In some exemplary embodiments, the control device 214 is configured to perform the method operation at 10 or parts of the method operation at 10 and/or to provide it/them to the mobile device 100/the control device 114.

A further exemplary embodiment is a computer program for performing at least one of the methods described above when the computer program runs on a computer, a processor or a programmable hardware component. A further exemplary embodiment is also a digital storage medium that is machine-readable or computer-readable and that has electronically readable control signals that can interact with a programmable hardware component such that one of the methods described above is carried out.

The features disclosed in the description above, the claims below and the appended figures may be of importance, and can be implemented, both individually and in any combination for the realization of an exemplary embodiment in its various configurations.

Although some properties have been described in connection with an apparatus, it goes without saying that these properties also represent a description of the corresponding method, so that a block or a component of an apparatus should also be understood as a corresponding method operation or as a feature of a method operation. Analogously to this, properties described in connection with or as a method operation also represent a description of a corresponding block or detail or feature of a corresponding apparatus.

Depending on implementation requirements, exemplary embodiments can be implemented in hardware or in software. The implementation can be performed using a digital storage medium, for example, a floppy disk, a DVD, a Blu-Ray disk, a CD, a ROM, a PROM, an EPROM, an EEPROM or a FLASH memory, a hard disk or another magnetic or optical memory that stores electronically readable control signals that can interact or do interact with a programmable hardware component such that the respective method is performed.

A programmable hardware component may be formed by a processor, a computer processor (CPU=Central Processing Unit), a graphics processor (GPU=Graphics Processing Unit), a computer, a computer system, an application-specific integrated circuit (ASIC), an integrated circuit (IC), a system on chip (SOC), a programmable logic element or a field programmable gate array (FPGA) with a microprocessor.

The digital storage medium may therefore be machine-readable or computer-readable. Some exemplary embodiments thus comprise a data medium that has electronically readable control signals that are capable of interacting with a programmable computer system or a programmable hardware component such that one of the methods described herein is performed. At least one exemplary embodiment is therefore a data medium (or a digital storage medium or a computer-readable medium) on which the program for performing one of the methods described herein is recorded.

Generally, exemplary embodiments may be implemented as a program, firmware, computer program or computer program product having a program code or as data, wherein the program code or the data is or are operative to the effect of performing one of the methods when the program runs on a processor or a programmable hardware component. The program code or the data may, by way of example, also be stored on a machine-readable medium or data medium. The program code or the data can be present inter alia as source code, machine code or byte code and as other intermediate code.

A further exemplary embodiment is further a data stream, a signal train or a sequence of signals that represents or represent the program for performing one of the methods described herein. The data stream, the signal train or the sequence of signals may be configured, by way of example, to the effect of being transferred via a data communication link, for example, via the Internet or another network. Exemplary embodiments are thus also data-representing signal trains that are suitable for sending via a network or a data communication link, wherein the data represent the program.

A program according to at least one exemplary embodiment can implement one of the methods while it is being performed, for example, by reading memory locations or writing a datum or multiple data thereto, as a result of which, if need be, switching processes or other processes are brought about in transistor structures, in amplifier structures or in other electrical components, optical components, magnetic components or components operating according to another function a principle. Accordingly, by virtue of a memory location being read, it is possible for data, values, sensor values or other information to be captured, determined or measured by a program. A program can therefore capture, determine or measure variables, values, measured variables and other information by reading one or more memory locations, and can bring about, prompt or perform an action, and actuate other devices, machines and components, by writing to one or more memory locations.

The exemplary embodiments described above are merely an illustration of the principles of the present disclosure. It goes without saying that modifications and variations of the arrangements and details described herein will become apparent to other persons skilled in the art. Therefore, the intention is for the disclosure to be restricted only by the scope of protection of the patent claims below, and not by the specific details that have been presented herein on the basis of the description and the explanation of the exemplary embodiments.

LIST OF REFERENCE SIGNS

10 Ascertain
12 Capture
12a Obtain
12b Obtain
12c Ascertain
14 Determine
16 Determine
16a Assign
18 Determine
20 Output
30 Capture
40 Transmit
100 Mobile device
110 Apparatus for a mobile device
112 Communication device 114 Control device
200 Transportation vehicle
210 Apparatus for a transportation vehicle
212 Communication device
214 Control device
2002 Depiction of a warning
2004 Depiction of an intervention option
3002 Depiction of the intervention option "Close windows"
3002a Display
3002b Trigger
3002c Confirmation
3004 Depiction of an intervention option
3006 Depiction of an ambient indicator

The invention claimed is:

1. A method for remotely controlling functions of a transportation vehicle by a mobile device, the method comprising:
   ascertaining a proposal to trigger a functionality of the transportation vehicle including capturing a plurality of ambient indicators and determining the proposal based on the plurality of ambient indicators;
   determining functionalities triggered by the user in a plurality of situations;
      wherein the determining of the proposal is based on the functionalities triggered by the user and on the situation; and
      wherein the determining functionalities comprises assigning situations from the plurality of situations to triggered functionalities, based on a learning algorithm or based on a probability functions;
   outputting the proposal via an output device;
   capturing a reaction of a user of the mobile device, wherein the reaction consists of an input via an input device or of the absence of an input; and
   transmitting a trigger signal for the functionality from the mobile device to the transportation vehicle in response to the input being absent within a period of time or in response to the input not being consistent with termination of the proposal.

2. The method of claim 1, wherein the outputting of the proposal is consistent with outputting of an intervention option for the user of the mobile device that allows the user to influence the triggering of the functionality via the input device.

3. The method of claim 1,
   wherein the capturing comprises obtaining at least one subset of the plurality of ambient indicators from the mobile device, and/or
   wherein the capturing comprises obtaining at least one subset of the plurality of ambient indicators from the transportation vehicle, and/or
   wherein the capturing comprises ascertaining at least one subset of the plurality of ambient indicators by at least one sensor device of the mobile device.

4. The method of claim 1, wherein the plurality of ambient indicators comprises at least two elements from the group comprising the closed state of the transportation vehicle, position of the transportation vehicle, position of the transportation vehicle relative to a point of interest, position of the transportation vehicle relative to the mobile device, trajectory of the transportation vehicle, state of the transportation vehicle, speed of the transportation vehicle, exterior temperature, interior temperature of the transportation vehicle, position of the mobile device, fuel tank level of the transportation vehicle, time of day, and day of the week.

5. The method of claim 1, further comprising determining a situation that the vehicle, the mobile device and/or the user of the mobile device is/are in based on the plurality of ambient indicators, wherein the determining of the proposal is further consistent with a selection of the proposal based on the situation.

6. The method of claim 1, wherein the outputting comprises visual output, haptic output, audio output or audio-visual output.

7. A program code product having a program code for performing the method for remotely controlling functions of a transportation vehicle by a mobile device when the program code is executed on a computer, a processor, a control module, or a programmable hardware component, the method comprising:
   ascertaining a proposal to trigger a functionality of the transportation vehicle including capturing a plurality of ambient indicators and determining the proposal based on the plurality of ambient indicators;
   determining a situation that the vehicle, the mobile device and/or the user of the mobile device is/are in based on the plurality of ambient indicators, wherein the determining of the proposal is further consistent with a selection of the proposal based on the situation;
   determining functionalities triggered by the user in a plurality of situations, and wherein the determining of the proposal is based on the functionalities triggered by the user and on the situation;
   assigning situations from the plurality of situations to triggered functionalities, based on a learning algorithm or based on a probability functions;
   outputting the proposal via an output device;
   capturing a reaction of a user of the mobile device, wherein the reaction consists of an input via an input device or of the absence of an input; and
   transmitting a trigger signal for the functionality from the mobile device to the transportation vehicle in response to the input being absent within a period of time or in response to the input not being consistent with termination of the proposal.

8. The program code product of claim 7, wherein the outputting of the proposal is consistent with outputting of an intervention option for the user of the mobile device that allows the user to influence the triggering of the functionality via the input device.

9. The program code product of claim 7,
   wherein the capturing comprises obtaining at least one subset of the plurality of ambient indicators from the mobile device, and/or
   wherein the capturing comprises obtaining at least one subset of the plurality of ambient indicators from the transportation vehicle, and/or
   wherein the capturing comprises ascertaining at least one subset of the plurality of ambient indicators by at least one sensor device of the mobile device.

10. The program code product of claim 7, wherein the plurality of ambient indicators comprises at least two elements from the group comprising the closed state of the transportation vehicle, position of the transportation vehicle, position of the transportation vehicle relative to a point of interest, position of the transportation vehicle relative to the mobile device, trajectory of the transportation vehicle, state of the transportation vehicle, speed of the transportation vehicle, exterior temperature, interior temperature of the transportation vehicle, position of the mobile device, fuel tank level of the transportation vehicle, time of day, and day of the week.

11. The program code product of claim 7, wherein the outputting comprises visual output, haptic output, audio output or audiovisual output.

12. An apparatus for a mobile device, the apparatus comprising:
   a communication device for communication with a transportation vehicle; and
   a control device, configured to:
     control the communication device,
     ascertain a proposal to trigger a functionality of the transportation vehicle, including capturing a plurality of ambient indicators and determining the proposal based on the plurality of ambient indicators;
     determine functionalities triggered by the user in a plurality of situations;
       wherein the determining the proposal is further based on the functionalities triggered by the user and on the situation; and
       wherein the determining functionalities comprises assigning situations from the plurality of situations to triggered functionalities, based on a learning algorithm or based on a probability functions;
     output the proposal via an output device,
     capture a reaction of a user of the mobile device, wherein the reaction consists of an input via an input device or of the absence of an input,
     transmit a trigger signal for the functionality to the transportation vehicle via the communication device in response to the input being absent within a period of time or in response to the input not being consistent with termination of the proposal.

13. An apparatus for a transportation vehicle, the apparatus comprising:
   a communication device for communication with a mobile device; and
   a control device, configured to:
     control the communication device,
     provide information about one or more ambient indicators of the transportation vehicle for the mobile device via the communication device,
     obtain a trigger signal for a functionality of the transportation vehicle, for remotely controlling the transportation vehicle, wherein the trigger signal is based on a proposal to trigger the functionality based on a plurality of ambient indicators that a user of the mobile device has not terminated,
     control the transportation vehicle based on the trigger signal; and
     determine functionalities triggered by the user in a plurality of situations,
   wherein to ascertain the proposal, the control device captures a plurality of ambient indicators and determines the proposal based on the plurality of ambient indicators;
   wherein determining the proposal is based on the functionalities triggered by the user and on the situation; and
   wherein determining functionalities comprises assigning situations from the plurality of situations to triggered functionalities, based on a learning algorithm or based on a probability functions.

\* \* \* \* \*